US011836267B2

(12) United States Patent
Hetzler

(10) Patent No.: US 11,836,267 B2
(45) Date of Patent: Dec. 5, 2023

(54) OPAQUE ENCRYPTION FOR DATA DEDUPLICATION

(71) Applicant: International Business Machines Corporation, Armonk, NY (US)

(72) Inventor: Steven Robert Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 16/544,708

(22) Filed: Aug. 19, 2019

(65) Prior Publication Data

US 2021/0056223 A1 Feb. 25, 2021

(51) Int. Cl.
*G06F 21/62* (2013.01)
*H04L 9/08* (2006.01)
*G06F 16/215* (2019.01)

(52) U.S. Cl.
CPC ........ *G06F 21/6227* (2013.01); *G06F 16/215* (2019.01); *H04L 9/085* (2013.01); *G06F 2221/2107* (2013.01)

(58) Field of Classification Search
CPC ............... G06F 21/6227; G06F 21/215; G06F 2221/2107; H04L 9/085
See application file for complete search history.

(56) References Cited

U.S. PATENT DOCUMENTS

| 9,547,774 B2 | 1/2017 | Bestler et al. |
| 10,158,483 B1 | 12/2018 | Newman |

| 2015/0227757 A1* | 8/2015 | Bestler .................. H04L 9/3239 713/167 |
| 2016/0344553 A1 | 11/2016 | Chen et al. |
| 2017/0286696 A1 | 10/2017 | Shetty et al. |
| 2018/0032261 A1 | 2/2018 | Singhai et al. |
| 2019/0097789 A1 | 3/2019 | Rangayyan et al. |

(Continued)

FOREIGN PATENT DOCUMENTS

| CN | 102156703 A | 8/2011 |
| CN | 102467528 A | 5/2012 |
| CN | 102811212 A | 12/2012 |

(Continued)

OTHER PUBLICATIONS

International Search Report and Written Opinion from PCT Application No. PCT/IB2020/057505, dated Nov. 3, 2020.

(Continued)

*Primary Examiner* — Ashokkumar B Patel
*Assistant Examiner* — William B Jones
(74) *Attorney, Agent, or Firm* — Zilka-Kotab, P.C.

(57) ABSTRACT

A computer-implemented method includes receiving deduplication information at a storage system. The deduplication information is accessible to the storage system for performing operations thereon. The deduplication information includes signatures associated with portions of client data. The method also includes receiving the client data encrypted with a client secret key. The client secret key is unavailable to the storage system. The method includes deduplicating data chunks stored in the storage system against chunks of the client data, wherein the client data chunks are selected from the client data for deduplication using the deduplication information.

21 Claims, 9 Drawing Sheets

(56) References Cited

U.S. PATENT DOCUMENTS

2020/0119911 A1* 4/2020 Shemer ................ H04L 9/0894

FOREIGN PATENT DOCUMENTS

| | | |
|---|---|---|
| CN | 103136243 A | 6/2013 |
| CN | 103731423 A | 4/2014 |
| CN | 103763362 A | 4/2014 |
| CN | 105681273 A | 6/2016 |
| WO | 2009134662 A2 | 11/2009 |

OTHER PUBLICATIONS

Brocade, "Encryption Solution Design and Deployment Considerations," Brocade Communications Systems Inc., Data Center Reference Guide, 2013, pp. 1-58.
CSRC, "Cloud Computing," Computer Security Resource Center, Oct. 2017, 3 pages, retrieved from https://csrc.hist.gov/projects/cloud-computing.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
Response to Examination Report from European Application No. GB2203008.4, dated Jun. 14, 2022.
Examination Report from European Application No. GB2203008.4, dated May 4, 2022.

* cited by examiner

OPAQUE ENCRYPTION FOR DATA DEDUPLICATION

BACKGROUND

The present invention relates to data deduplication, and more particularly, this invention relates to opaque encryption for data deduplication in cloud storage systems and networks.

Conventional data reduction techniques, such as deduplication and/or compression, do not provide meaningful reduction when applied to encrypted data. Deduplication of multiple sets of data, each encrypted with a unique encryption key, breaks down where the various encryption algorithms prevent conventional deduplication processes from identifying duplicate data chunks. Conventional data reduction techniques also do not provide adequate data privacy between the client and the storage system.

For example, one known bring your own key (BYOK) encryption technique involves a multi-party trust system. Although all data reduction functions may be provided by the storage system which has access to all the data, conventional BYOK systems provide no data privacy between the storage system and the client because the storage system has access to the client key. The third party key service also has access to the shared encryption key used to encrypt the client data. Data privacy only exists between the users for this form of BYOK encryption.

Conventional at-rest encryption encrypts unencrypted input data with key(s) known to the storage system. The storage system may decrypt all the data and perform deduplication against all the data in the system. However, at-rest encryption provides no data privacy.

Conventional full client-side encryption encrypts the data with a key unknown to the storage system. The storage system only deduplicates data encrypted with a common key. Full client-side deduplication provides relatively high data privacy but impedes deduplication efficiency.

BRIEF SUMMARY

A computer-implemented method, according to one approach, includes receiving deduplication information at a storage system. The deduplication information is accessible to the storage system for performing operations thereon. The deduplication information includes signatures associated with portions of client data. The method also includes receiving the client data encrypted with a client secret key. The client secret key is unavailable to the storage system. The method includes deduplicating data chunks stored in the storage system against chunks of the client data, wherein the client data chunks are selected from the client data for deduplication using the deduplication information. The method provides improved data privacy, enhanced data reduction, and reduced client overhead relative to conventional techniques.

The method may optionally include receiving data encrypted with a second client key and deduplicating data chunks wherein one or more data chunks are encrypted with the first client secret key and one or more data chunks are encrypted with the second client secret key. The foregoing method enables deduplication for data chunks encrypted with different keys and provides data privacy between users and between users and the storage system.

A computer program product for opaque encryption, according to one approach, includes a computer readable storage medium having program instructions embodied therewith. The program instructions are executable by a computer to cause the computer to perform the foregoing method.

A system, according to one approach, includes a processor and logic integrated with the processor, executable by the processor, or integrated with and executable by the processor. The logic is configured to perform the foregoing method.

A computer-implemented method, according to one approach, includes generating deduplication information. The deduplication information includes signatures associated with portions of client data. The method includes encrypting the deduplication information using a shared key and encrypting the client data with a client secret key. The method also includes sending the deduplication information and the client data to a storage system for deduplication. The method includes requesting the client data from the storage system and receiving the client data as data chunks, wherein one or more of the data chunks are encrypted with the client secret key and one or more of the data chunks are encrypted with the shared key. The method provides improved data privacy, enhanced data reduction, and reduced client overhead relative to conventional techniques.

The method optionally includes requesting the shared key from the storage system. The method enables encrypting the deduplication information with an encryption key which is accessible to the storage system while maintaining data privacy between the storage system and the client.

A system, according to one approach, includes a processor and logic integrated with the processor, executable by the processor, or integrated with and executable by the processor. The logic is configured to perform the foregoing method.

Other aspects and configurations of the present invention will become apparent from the following detailed description, which, when taken in conjunction with the drawings, illustrate by way of example the principles of the invention.

DETAILED DESCRIPTION

Figure 1:
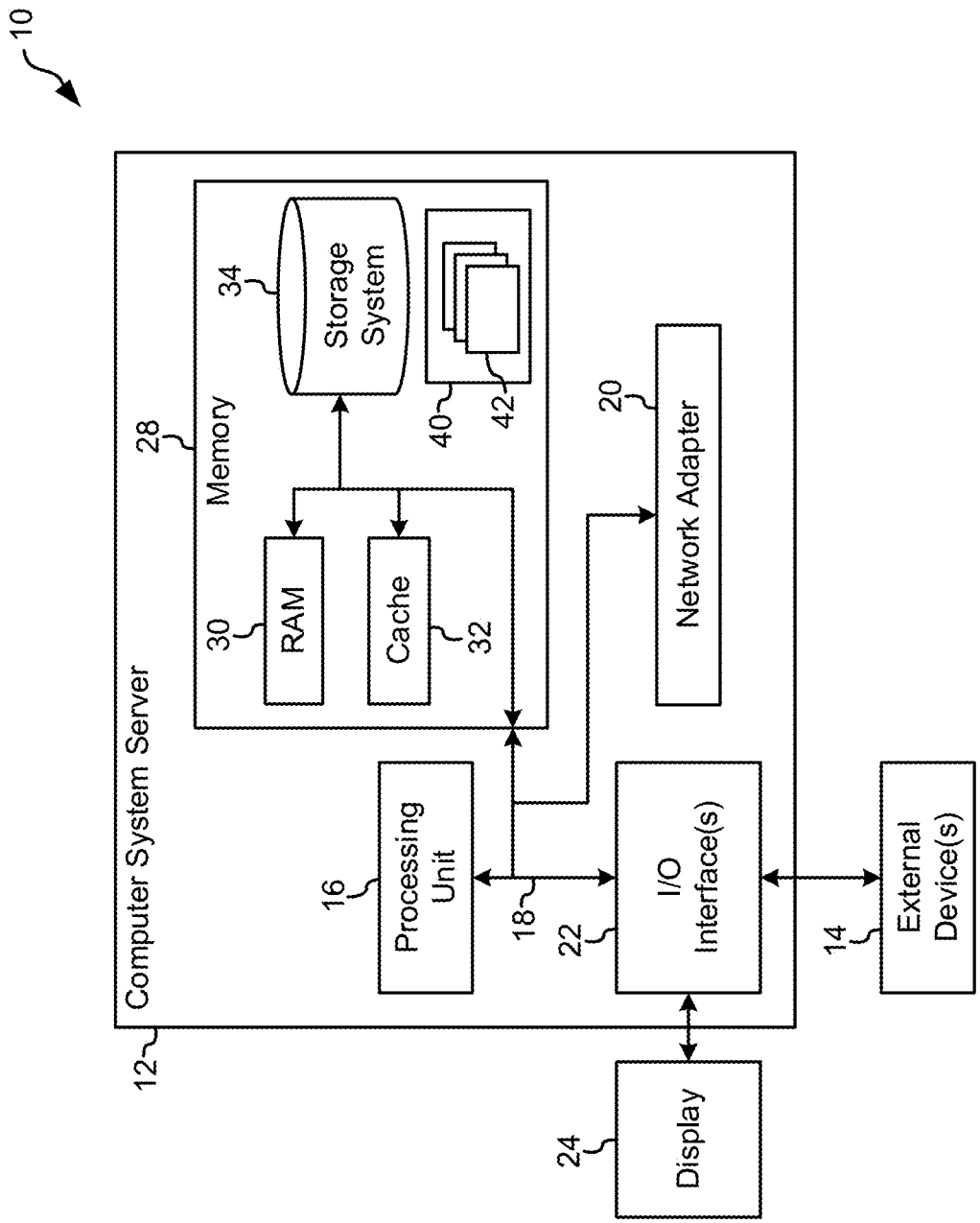
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several configurations of data deduplication with opaque encryption.

In one general configuration, a computer-implemented method includes receiving deduplication information at a storage system. The deduplication information is accessible to the storage system for performing operations thereon. The deduplication information includes signatures associated with portions of client data. The method also includes receiving the client data encrypted with a client secret key. The client secret key is unavailable to the storage system. The method includes deduplicating data chunks stored in the storage system against chunks of the client data, wherein the client data chunks are selected from the client data for deduplication using the deduplication information.

In another general configuration, a computer program product for opaque encryption includes a computer readable storage medium having program instructions embodied therewith. The program instructions are executable by a computer to cause the computer to perform the foregoing method.

In yet another general configuration, a system includes a processor and logic integrated with the processor, executable by the processor, or integrated with and executable by the processor. The logic is configured to perform the foregoing method.

In one general configuration, a computer-implemented method includes generating deduplication information. The deduplication information includes signatures associated with portions of client data. The method includes encrypting the deduplication information using a shared key and encrypting the client data with a client secret key. The method also includes sending the deduplication information and the client data to a storage system for deduplication. The method includes requesting the client data from the storage system and receiving the client data as data chunks, wherein one or more of the data chunks are encrypted with the client secret key and one or more of the data chunks are encrypted with the shared key.

In another general configuration, a system includes a processor and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, configurations of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
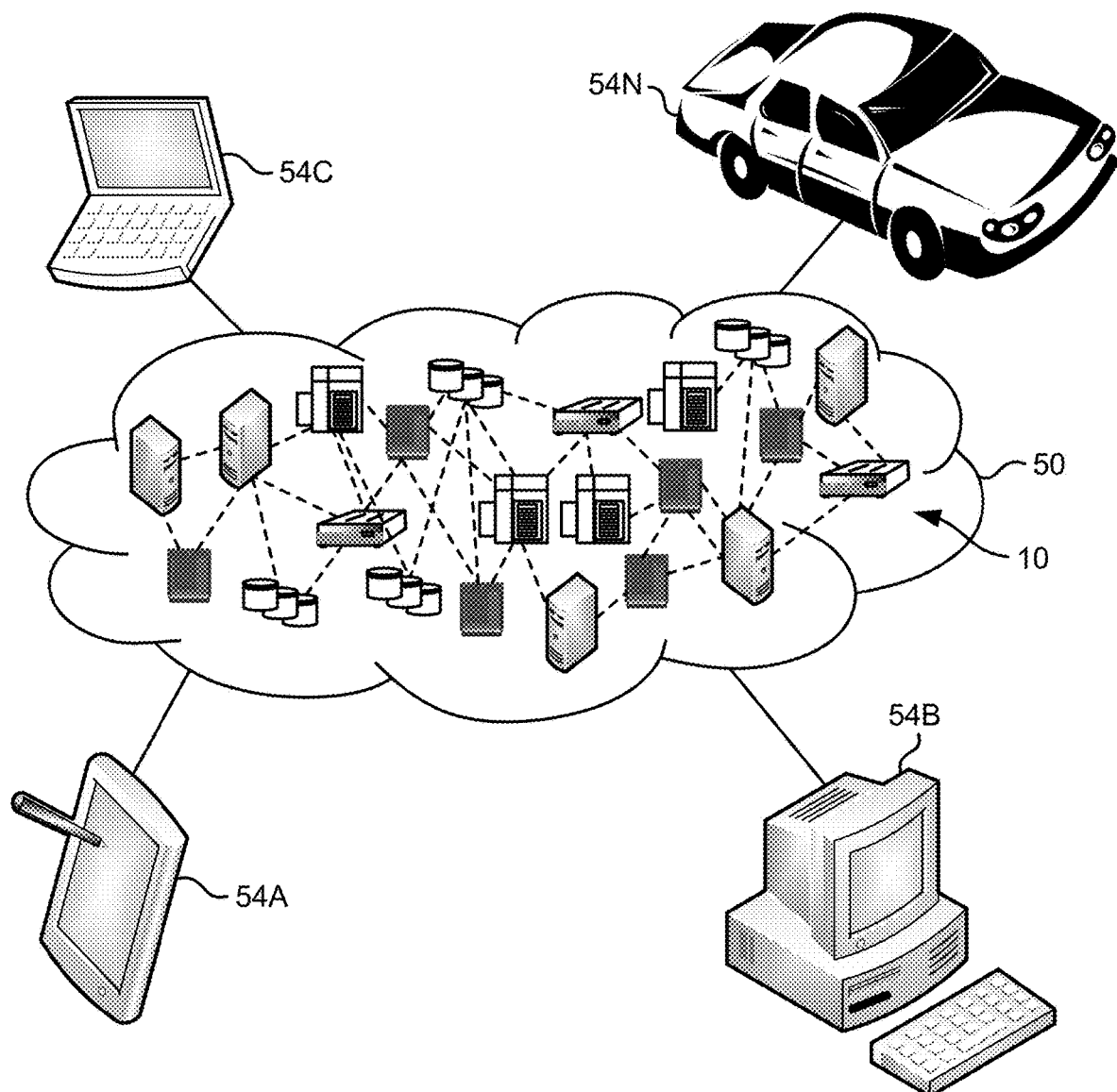
FIG. 2 depicts a cloud computing environment in accordance with one configuration of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
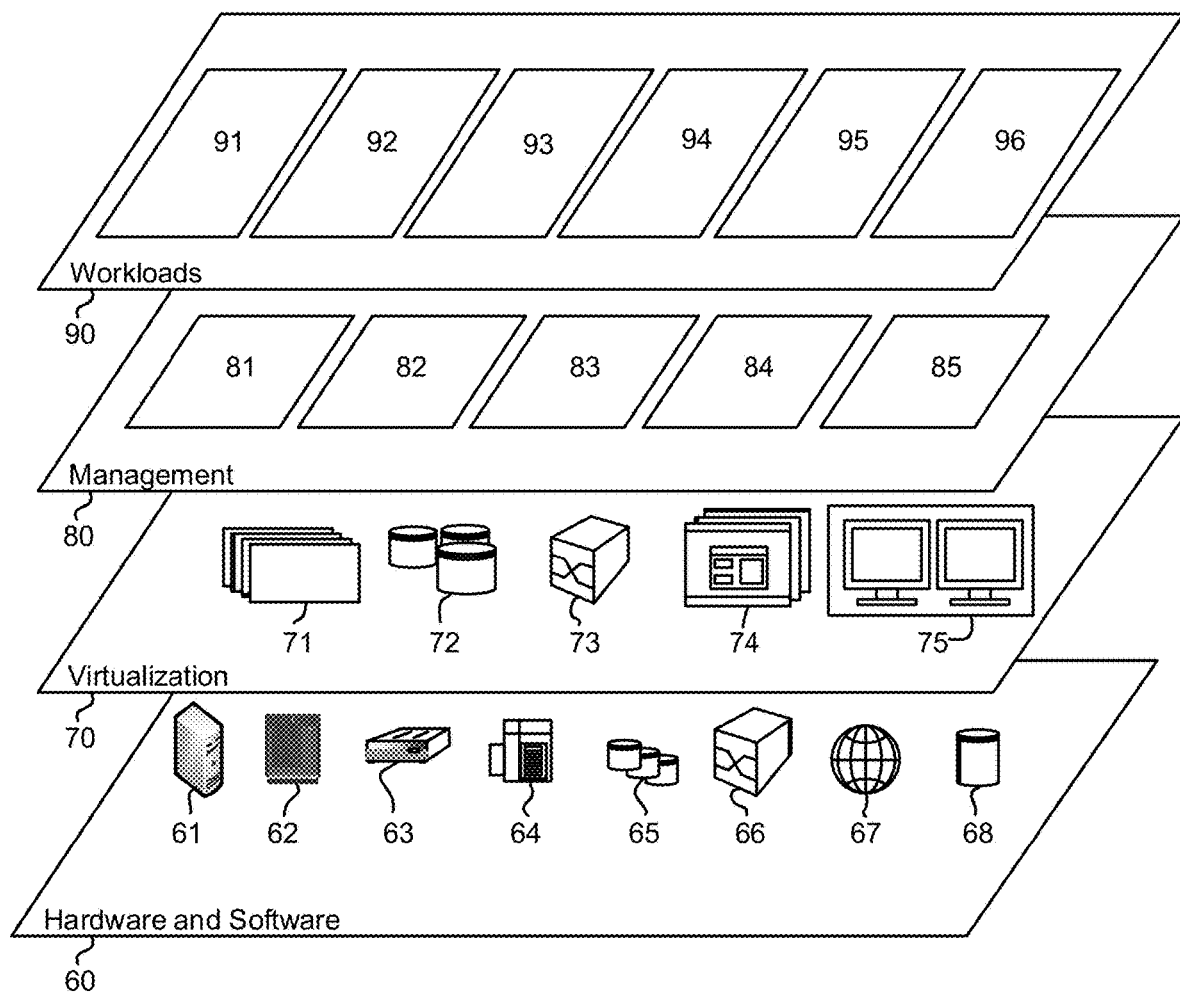
FIG. 3 depicts abstraction model layers in accordance with one configuration of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and configurations of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some configurations, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data deduplication with opaque encryption 96.

Conventional data reduction techniques, such as deduplication and/or compression, do not provide meaningful reduction when applied to encrypted data. Deduplication of multiple sets of data, each encrypted with a unique encryption key, breaks down where the various encryption algorithms prevent conventional deduplication processes from identifying duplicate data chunks. Conventional data reduction techniques also do not provide adequate data privacy between the client and the storage system.

For example, one known bring your own key (BYOK) encryption technique involves a multi-party trust system. A client requests an encryption key from a third party key service and the key is returned to the client. The storage system may check out the same encryption key. The client encrypts the data with the shared encryption key and sends the data to the storage system. The storage system is able to decrypt the data using the shared encryption key and re-encrypts the data using the storage system key to store the data. On a client read operation, the storage system decrypts the data using the storage system key, re-encrypts the data using the shared encryption key and returns the data to the client. Although all data reduction functions may be provided by the storage system which has access to all the data (e.g., in the clear, encrypted with the storage system key, encrypted with the shared encryption key, etc.), conventional BYOK systems provide no data privacy between the storage system and the client because the storage system has access to the client key (e.g., the shared encryption key). The third party key service also has access to the shared encryption key used to encrypt the client data. Data privacy only exists between the users for this exemplary BYOK encryption technique.

In another BYOK technique, no third party service is involved in the exchange of data and the encryption key is shared with the storage system directly. This technique does not provide data privacy between the user and the storage system. Another exemplary conventional BYOK technique uses a "trusted decrypter" function on the storage system but is still lacking in terms of data privacy.

Conventional at-rest encryption encrypts unencrypted input data with key(s) known to the storage system. The storage system may decrypt all the data and perform deduplication against all the data in the system. At-rest encryption provides no data privacy.

Conventional full client-side encryption encrypts the data with a key unknown to the storage system. The storage system only deduplicates data encrypted with a common key. Full client-side deduplication provides relatively high data privacy but impedes deduplication efficiency.

In stark contrast, various approaches described herein provide the ability for a client to deliver encrypted data to a storage system for data compression and/or deduplication without the storage system having access to the client secret encryption and/or decryption key. At least some of the approaches disclosed herein encrypt data in a manner which is opaque to a storage system and deduplicate the data against other data in the storage system. The opaque encryption provides more data privacy compared to conventional encryption techniques, including BYOK techniques. Various operations for opaque encryption provide relatively better data reduction than conventional full client-side encryption and less client overhead than client-side deduplication.

At least some of the configurations presented herein perform compression and generate dedupe metadata on the client system and the deduplication is performed in the storage system. The client data is encrypted with the client secret encryption key prior to the data being sent to the storage system in one approach. In contrast to known BYOK techniques, client data is written to the storage system encrypted with the client secret encryption key and the storage system may not decrypt the client data because the storage system never has access to the client secret decryption key in preferred approaches. At least some of the operations described herein may be used with symmetric key encryption and/or asymmetric encryption (e.g., public key infrastructure (PKI)). It should be understood by one having ordinary skill in the art that PKI encryption may be performed according any configurations known in the art. For example, a public key in PKI is not a secret key, and encrypting data with the public key requires a corresponding secret private key to decrypt.

Figure 4:
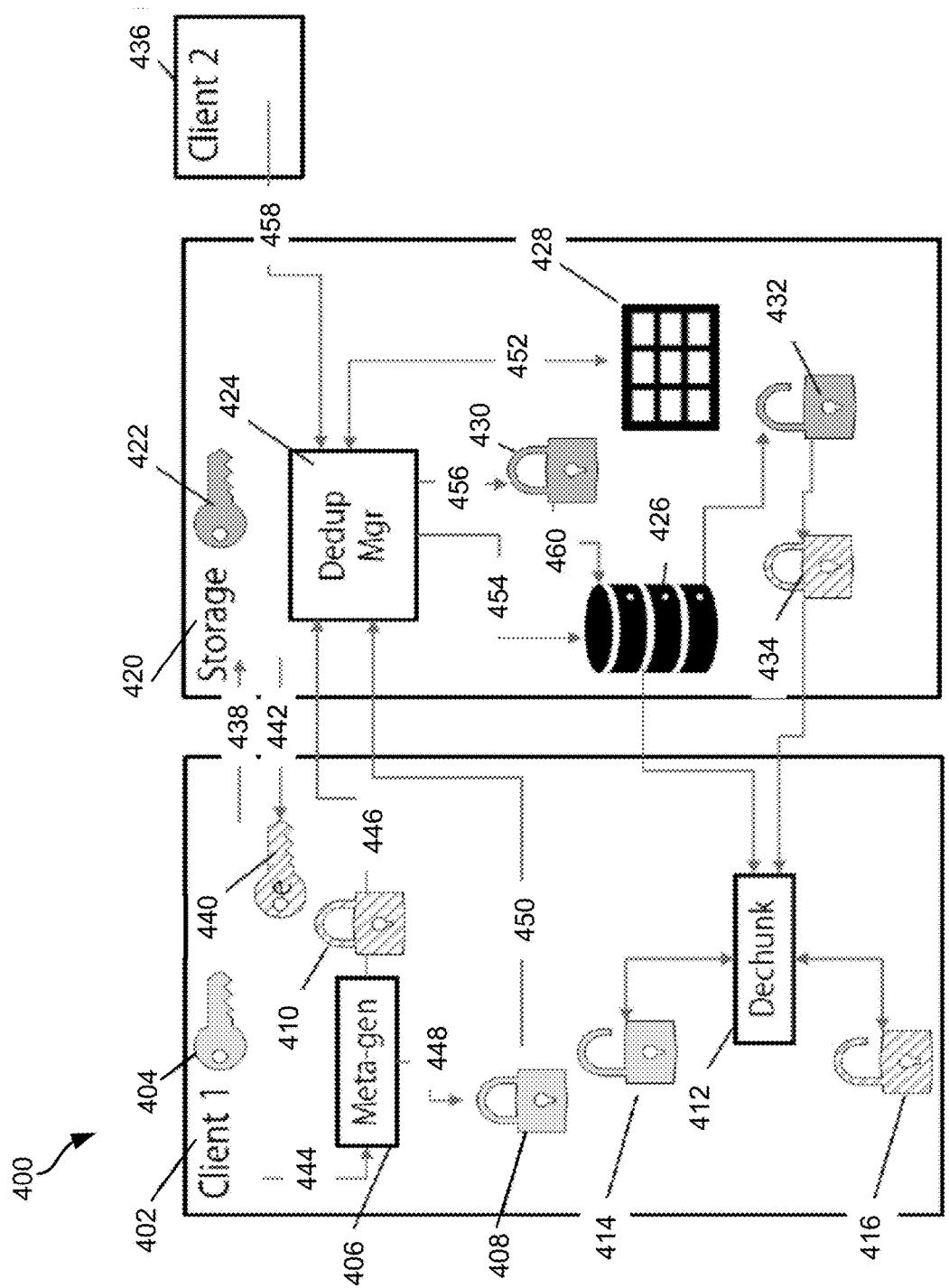
FIG. 4 is a high level architecture, in accordance with one configuration of the present invention.

FIG. 4 is a high-level architecture, in accordance with various configurations. The architecture 400 may be implemented in accordance with the present invention in any of the environments depicted in FIGS. 1-3 and 5-9, among others, in various configurations. Of course, more or less elements than those specifically described in FIG. 4 may be included in architecture 400, as would be understood by one of skill in the art upon reading the present descriptions.

Architecture 400 depicts an exemplary implementation of a write operation using a symmetric key encryption. Architecture 400 includes client 1 side 402. As shown, client 1 side 402 sends encrypted data to the storage system 420 (to be discussed in detail below).

Client 1 side 402 comprises a client secret encryption key 404. In preferred approaches, the client secret encryption key 404 never leaves client 1 side 402. In this preferred approach, the storage system 420 does not see the encrypted data in the clear at any point in a data transfer. In preferred approaches, the client secret encryption key 404 is not shared with the storage system 420, client 2 side 436 (to be discussed in detail below), any other clients, any other storage system, etc. The client secret encryption key 404 may be a symmetric key, an asymmetric key, etc. As shown, the client secret encryption key 404 is a symmetric key.

Client 1 side 402 comprises a meta-generator 406. In a preferred approach, the meta-generator 406 computes deduplication metadata associated with the data. In various configurations, the meta-generator 406 may be located on the client 1 side 402 and/or on the storage system 420.

In a preferred approach, the meta-generator 406 performs metadata operations on data on the client 1 side 402 and identifies data deduplication opportunities in the data. The meta-generator 406 identifies data deduplication opportunities using any data deduplication techniques known in the art. In one aspect, the meta-generator 406 uses a sliding window variable chunk deduplication technique to identify data deduplication opportunities. The meta-generator 406 identifies and/or calculates deduplication signatures (e.g., rolling min hashes, cryptographic hashes, etc.). The meta-generator 406 generates metadata associated with the data deduplication opportunities (e.g., deduplication information) including pointers, chunk lengths, chunk signatures, etc. The deduplication information may be encrypted with a shared ephemeral key provided by the storage system as discussed in detail below.

In one approach, the meta-generator 406 compresses data using any data compression technique known in the art. In some approaches, various compression techniques may be applied before and/or after chunking. In one configuration, pre-chunking compression may be a type of compression which improves the performance of the chunking. In another configuration, post-chunking compression may be tuned towards minimizing the resulting chunk size.

Signature computation may be performed on the data chunk before and/or after compression. Pre-compression signature computations allow the signatures to be verified after decompression on read. Post-compression signature computations allow the signatures to be checked while the chunk is in a compressed state.

Client 1 side 402 comprises a client secret key encrypter 408. The client secret key encrypter 408 may encrypt data with the client secret encryption key 404 as would be understood by one having ordinary skill in the art upon reading the present disclosure.

Client 1 side 402 comprises an ephemeral key encrypter 410. The ephemeral key encrypter 410 may encrypt data with the storage ephemeral key 440 (to be discussed in detail below) as would be understood by one having ordinary skill in the art upon reading the present disclosure.

Client 1 side 402 comprises a dechunker 412. The dechunker 412 may dechunk data chunks received from the storage system where the data chunks are encrypted with multiple encryption keys. In a preferred approach, data chunks which are encrypted with multiple encryption keys refer to data chunks encrypted with multiple chunk encryption keys. For example, write data 444 (to be discussed in detail below) may comprise a set of data chunks wherein subsets of data chunks and/or individual data chunks are encrypted with different (e.g., unique) keys. Specifically, in one exemplary configuration, at least some data chunks are encrypted with a first key and at least some other data chunks are encrypted with a second key wherein the first key and second key are different keys. Data chunks encrypted with multiple encryption keys should not be interpreted as data chunks which are subject to multiple encryption unless expressly disclosed herein. For example, data chunks which are subject to multiple encryption refer to data chunks encrypted with a first key and encrypted a second time with a different key, etc.

The dechunker 412 may identify which encryption key a data chunk is encrypted with and forward the data chunk to the corresponding decrypter (e.g., the client secret key decrypter 414, the ephemeral key decrypter 416, etc.). Each decrypter may decrypt data with a corresponding key as would be understood by one having ordinary skill in the art upon reading the present disclosure.

Architecture 400 includes a storage system 420. The storage system 420 may be any type of storage system known in the art. It should be understood by one having ordinary skill in the art that the storage system 420 may have more or less components than those listed herein. The storage system 420 preferably performs various deduplication operations described herein.

Storage system 420 comprises a storage secret encryption key 422. In a preferred approach, the storage secret encryption key 422 never leaves the storage system 420. In this preferred approach, the storage secret encryption key 422 is not shared with the client 1 side 402, client 2 side 436, any other clients, any other storage systems, etc. The storage secret encryption key 422 may be a symmetric key, an asymmetric key, etc. As shown, the storage secret encryption key 422 is a symmetric key.

Storage system 420 comprises a deduplication manager 424. The deduplication manager 424 locates and/or identifies duplicate data based on the deduplication information provided by client 1 side 402. For a chunking deduplication, the deduplication information is used with the chunk metadata to identify data chunks which are duplicates. The deduplication manager 424 performs any associated deduplication operations as would be understood by one having ordinary skill in the art upon reading the present disclosure. Any known deduplication techniques may be used to deduplicate the data chunks.

Storage system 420 comprises chunk storage 426. The chunk storage 426 may comprise any storage components known in the art. The chunk storage 426 may store data chunks, deduplicated data, non-deduplicated data, encrypted data, unencrypted data, deduplication information, etc., in any manner known in the art. In one approach, the chunk storage 426 stores data chunks, deduplicated data, non-deduplicated data, encrypted data, unencrypted data, deduplication information, etc., in a table.

Storage system 420 comprises chunk metadata 428. The chunk metadata 428 may comprise any metadata associated with the non-deduplicated and/or deduplicated data chunks including pointers, chunk lengths, chunk signatures, etc. The chunk metadata 428 may be updated in response to receiving new data from the deduplication manager 424.

Storage system 420 comprises a storage secret key encrypter 430. The storage secret key encrypter 430 may encrypt data with the storage secret encryption key 422 as would be understood by one having ordinary skill in the art upon reading the present disclosure.

Storage system 420 comprises a storage secret key decrypter 432. The storage secret key decrypter 432 may decrypt data encrypted with the storage secret encryption key 422 as would be understood by one having ordinary skill in the art upon reading the present disclosure.

Storage system 420 comprises a storage ephemeral key encrypter 434. The storage ephemeral key encrypter 434 may encrypt data with the storage ephemeral key 440 (to be discussed in detail below) as would be understood by one having ordinary skill in the art upon reading the present disclosure.

Architecture 400 includes client 2 side 436. As shown, client 2 side 436 uses at-rest encryption storage and sends unencrypted data to the storage system 420. Client 2 side 436 may send unencrypted data because client 2 side 436 does not have any data privacy concerns in at least some approaches. Unencrypted data may refer to data which the storage system receives in the clear. In various approaches, any communication encryption known in the art may be implemented between the various components.

Client 1 side 402 may issue a request 438 to storage system 420 for an ephemeral key from the storage system 420. In one approach, the client 1 side 402 establishes a session with the storage system 420 via the request 438 to storage system 420 for an ephemeral key. The ephemeral key may be for encrypting data such that the storage system 420 may decrypt data sent from the client 1 side 402. A storage ephemeral key 440 may be returned in response 442 to the request 438.

In one approach, client 1 side 402 may encrypt the write data 444 prior to sending the write data 444 to the meta-generator 406. Client 1 side 402 sends the write data 444 and a key identification (ID) indicating the client secret key (e.g., the client secret encryption key 404) used to encrypt the write data 444 to the meta-generator 406.

In a preferred approach, the meta-generator 406 computes deduplication information (e.g., metadata) 446 associated with the write data 444. Deduplication information 446 may include operation details of a deduplication method as would be understood by one having ordinary skill in the art upon reading the present disclosure. In one configuration, for a chunking dedupe, the deduplication information 446 may include chunk start locations, chunk lengths, chunk signatures, similarity information, etc. In one approach, the chunk signature is a cryptographic hash which may be calculated in any manner known in the art. The deduplication information 446 may be encrypted with the storage ephemeral key 440 by the ephemeral key encrypter 410 and sent to the storage system 420 (e.g., the deduplication manager 424 in the storage system 420).

In one approach, the write data 444 is compressed by the meta-generator 406. Any form of compression known in the art may be used. The compressed data 448 may be sent to the client secret key encrypter 408 and encrypted with the client secret encryption key 404. The client key encrypted data 450 and the key ID associated with the client secret encryption key 404 may be sent to the storage system 420 (e.g., the deduplication manager 424). In another approach, the write data 444 is sent to the client secret key encrypter 408 and encrypted with the client secret encryption key 404. The write data 444 and the key ID associated with the client secret encryption key 404 may be sent to the storage system 420 (e.g., the deduplication manager 424). Data 450 is opaque to the storage system 420 (e.g., the client secret encryption key 404 is not available to the storage system 420). Write data 444 is opaque to the storage system 420 (e.g., the client secret encryption key 404 is not available to the storage system 420).

In various approaches, the deduplication information 446 and the write data 444 are tagged and/or otherwise indicated as associated. In one aspect, the deduplication information 446 is computed on the unencrypted data. The unencrypted data may include the chunk signature. Deduplication information 446 may be computed over the encrypted data. Deduplication information 446 which is computed over the encrypted data may include the signature of the encrypted chunk.

In a preferred approach, the deduplication manager 424 receives the encrypted write data 444 (e.g., data encrypted with a key that is not available to the storage system 420) and the encrypted deduplication information 446 (e.g., metadata encrypted with a key that is available to the storage system 420).

In one configuration, the deduplication manager 424 includes an ephemeral key decrypter. The ephemeral key decrypter may decrypt data encrypted with the storage ephemeral encryption key 440 as would be understood by one having ordinary skill in the art upon reading the present disclosure.

The deduplication manager 424 locates and/or identifies duplicate data based on the deduplication information 446. For a chunking deduplication, the deduplication information 446 is used with the chunk metadata 428 to identify data chunks that are duplicates. For example, the deduplication manager 424 compares the pointers, signatures, chunk lengths, etc., from the decrypted deduplication information 446 to any pointers, signatures, chunk lengths, etc., stored in the chunk metadata 428. The deduplication manager 424 performs any associated deduplication operations as would be understood by one having ordinary skill in the art upon reading the present disclosure.

In response to performing the associated deduplication operations, updates 452 may be performed on the chunk metadata 428. The updates 452 reflect changes due to the use of any deduplicated chunks, adding information relating to any remaining chunks, etc. The chunk metadata 428 includes information on the key ID encrypting a given data chunk. Any remaining data chunks associated with a new signatures (e.g., non-pre-existing in the chunk metadata 428) which are not deduplicated are written 454 to the chunk storage 426. Any new, non-deduplicated data chunks are written 454 to the chunk storage 426.

In a preferred configuration, the deduplication manager 424 dedupes for a client against data chunks that the client (e.g., client 1 side 402) is able to decrypt. Data chunks that the client 1 side 402 is able to decrypt include data chunks encrypted with a key belonging to the client 1 side 402 (e.g., the client secret encryption key 404), a key belonging to the storage system 420 (e.g., storage secret encryption key 422), unencrypted data, etc. Client 1 side 402 may be unable to decrypt data encrypted with a unique client secret encryption key that client 1 side 402 does not have access to.

Any remaining non-deduplicated data chunks 456 associated with a metadata update 452 may be encrypted with the storage secret encryption key 422 at the storage secret key encrypter 430. Non-deduplicated data chunks 456 associated with a metadata update 452 may refer to data chunks which pre-exist within the chunk metadata 428 and a metadata update 452 includes an additional pointer to a corresponding storage location.

In a preferred approach, the storage system 420 may access at-rest encrypted data, unencrypted data, shared key encrypted data, etc., because the storage system 420 may decrypt any such data as would be understood by one of ordinary skill in the art upon reading the present disclosure.

Client 2 side 436, as shown, uses at-rest encryption to send unencrypted data 458 to storage system 420. The unencrypted data 458 may be encrypted and stored in the chunk storage 426. The unencrypted data 458 may be received at the client 2 side 436 unencrypted in response to a read request. In a preferred approach, the deduplication manager 424 performs deduplication in a manner substantially similar to the deduplication performed for client 1 side 402. The unencrypted data 458 may be deduplicated against data chunks encrypted with a storage system key (e.g., the storage secret encryption key 422) and/or data chunks which are not encrypted.

In some configurations, the deduplication manager 424 may comprise a meta-generator (not shown) which performs substantially similar functions of meta-generator 406. Any remaining non-deduplicated data chunks 456 may be encrypted with the storage secret encryption key 422 at the storage secret key encrypter 430. The encrypted, non-deduplicated data chunks 460 may be written to the chunk storage 426. The storage system 420 may decrypt any data delivered according to the process described herein. All of the data chunks 460 may be used to deduplicate against any data chunks encrypted with any key.

Figure 5:
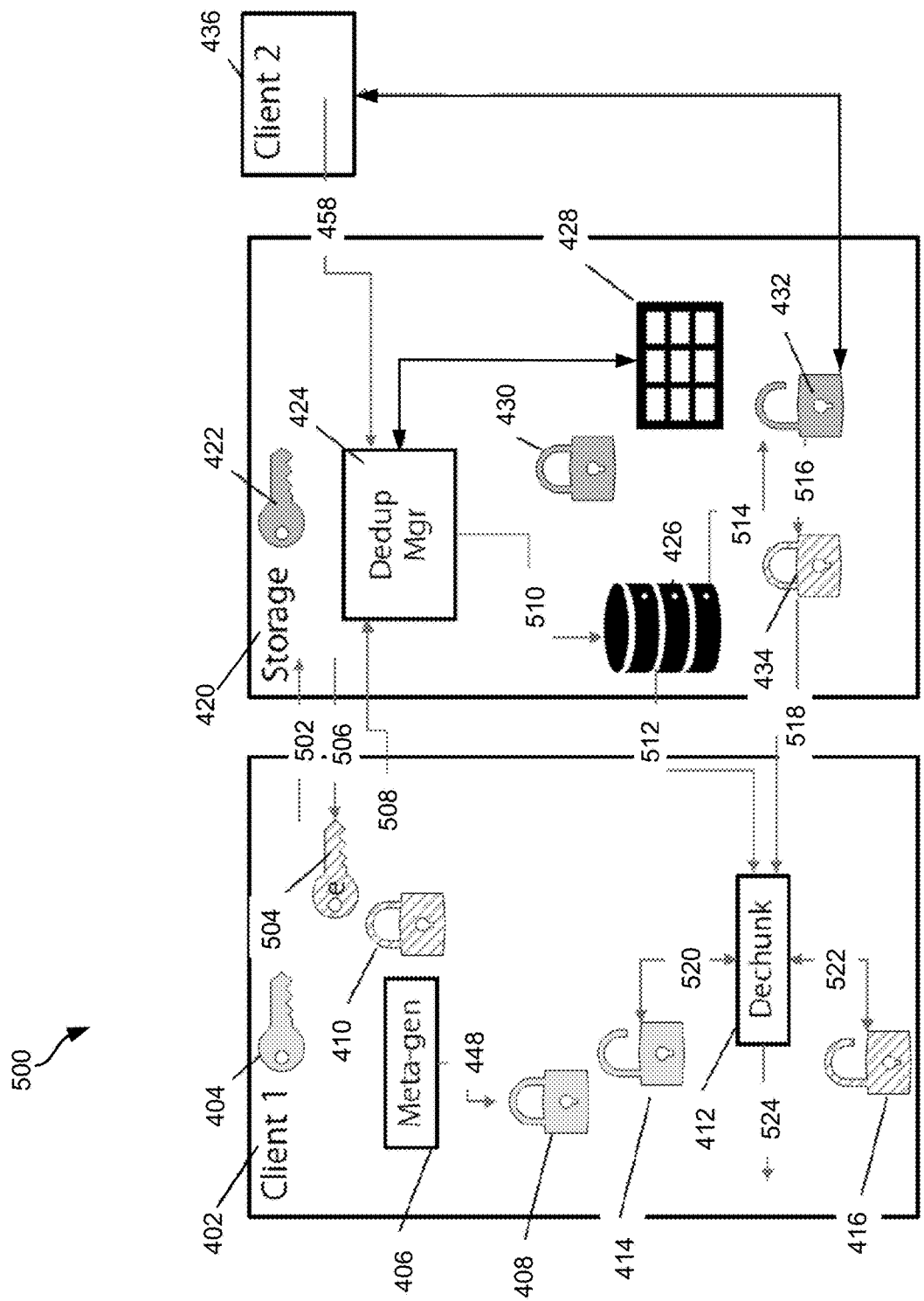
FIG. 5 is a high level architecture, in accordance with one configuration of the present invention.

FIG. 5 is a high-level architecture, in accordance with various configurations. The architecture 500 may be implemented in accordance with the present invention in any of the environments depicted in FIGS. 1-4 and 6-9, among others, in various configurations. Of course, more or less elements than those specifically described in FIG. 5 may be included in architecture 500, as would be understood by one of skill in the art upon reading the present descriptions.

Architecture 500 depicts an exemplary implementation of a read operation using a symmetric key encryption. In preferred configurations, a read operation comprises receiving data chunks which are encrypted with at least two keys, e.g., a client secret encryption key and a storage ephemeral key. For example, a read operation includes receiving one or more data chunks encrypted with a first key and one or more data chunks encrypted with a second key. Architecture 500 includes client 1 side 402.

Client 1 side 402 comprises a client secret encryption key 404. In preferred approaches, the client secret encryption key 404 never leaves client 1 side 402. In this preferred approach, the storage system 420 does not see the client side encrypted data in the clear at any point in a data transfer. In this preferred approach, the client secret encryption key 404 is not shared with the storage system 420, client 2 side 436 (to be discussed in detail below), any other clients, any other storage systems, etc. The client secret encryption key 404 may be a symmetric key, an asymmetric key, etc. As shown, the client secret encryption key 404 is a symmetric key.

Client 1 side 402 comprises a meta-generator 406. In a preferred approach, the meta-generator 406 computes deduplication metadata associated with the data. In various configurations, the meta-generator 406 may be located on the client 1 side 402 and/or on the storage system 420.

In a preferred approach, the meta-generator 406 performs metadata operations on data on the client 1 side 402 and identifies data deduplication opportunities in the data. The meta-generator 406 identifies data deduplication opportunities using any data deduplication techniques known in the art. In one aspect, the meta-generator 406 uses a sliding window variable chunk deduplication technique to identify data deduplication opportunities. The meta-generator 406 identifies and/or calculates deduplication signatures (e.g., rolling min hashes, cryptographic hashes, etc.). The meta-generator 406 generates metadata associated with the data deduplication opportunities (e.g., deduplication information) including pointers, chunk lengths, chunk signatures, etc. The deduplication information may be encrypted with an ephemeral key provided by the storage system as discussed in detail below.

In one approach, the meta-generator 406 compresses data using any data compression technique known in the art. In some approaches, various compression techniques may be applied before and/or after chunking. In one configuration, pre-chunking compression may be a type of compression which improves the performance of the chunking. In another configuration, post-chunking compression may be tuned towards minimizing the resulting chunk size.

Signature computation may be performed on the data chunk before and/or after compression. Pre-compression signature computations allow the signatures to be verified after decompression on read. Post-compression signature computations allow the signatures to be checked while the chunk is in a compressed state.

Client 1 side 402 comprises a client secret key encrypter 408. The client secret key encrypter 408 may encrypt data with the client secret encryption key 404 as would be understood by one having ordinary skill in the art upon reading the present disclosure.

Client 1 side 402 comprises an ephemeral key encrypter 410. The ephemeral key encrypter 410 may encrypt data with the ephemeral key 504 (to be discussed in detail below) as would be understood by one having ordinary skill in the art upon reading the present disclosure.

Client 1 side 402 comprises a dechunker 412. The dechunker 412 may dechunk data chunks received from the storage system where the data chunks are encrypted with multiple encryption keys. Data chunks encrypted with multiple encryption keys preferably refer to a set of data chunks wherein one or more data chunks are encrypted with a first key and one or more data chunks are encrypted with a second key. The dechunker 412 may identify which encryption key a data chunk is encrypted with and forward the data chunk to the corresponding decrypter (e.g., the client secret key decrypter 414, the ephemeral key decrypter 416, etc.). Each decrypter may decrypt data chunks encrypted with a corresponding key as would be understood by one having ordinary skill in the art upon reading the present disclosure.

Architecture 500 includes a storage system 420. The storage system 420 may be any type of storage system known in the art. It should be understood by one having ordinary skill in the art that the storage system 420 may have more or less components than those listed herein. The storage system 420 preferably performs various deduplication operations described herein.

Storage system 420 comprises a storage secret encryption key 422. In a preferred approach, the storage secret encryption key 422 never leaves the storage system 420. In this preferred approach, the storage secret encryption key 422 is not shared with the client 1 side 402, client 2 side 436, any other clients, any other storage systems, etc. The storage secret encryption key 422 may be a symmetric key, an asymmetric key, etc. As shown, the storage secret encryption key 422 is a symmetric key.

Storage system 420 comprises a deduplication manager 424. The deduplication manager 424 locates and/or identifies duplicate data based on the deduplication information provided by client 1 side 402. For a chunking deduplication, the deduplication information is used with the chunk metadata to identify data chunks which are duplicates. The deduplication manager 424 performs any associated deduplication operations as would be understood by one having ordinary skill in the art upon reading the present disclosure. Any deduplication techniques known in the art may be used.

Storage system 420 comprises chunk storage 426. The chunk storage 426 may comprise any storage components known in the art. The chunk storage 426 may store data chunks, deduplicated data, non-deduplicated data, encrypted data, unencrypted data, deduplication information, etc., in any manner known in the art. In one approach, the chunk storage 426 stores data chunks, deduplicated data, non-deduplicated data, encrypted data, unencrypted data, deduplication information, etc., in a table.

Storage system 420 comprises chunk metadata 428. The chunk metadata 428 may comprise any metadata associated with the non-deduplicated and/or deduplicated data chunks including pointers, chunk lengths, chunk signatures, etc.

Storage system 420 comprises a storage secret key encrypter 430. The storage secret key encrypter 430 may encrypt data with storage secret encryption key 422 as would be understood by one having ordinary skill in the art upon reading the present disclosure.

Storage system 420 comprises a storage secret key decrypter 432. The storage secret key decrypter 432 may decrypt data encrypted with the storage secret encryption key 422 as would be understood by one having ordinary skill in the art upon reading the present disclosure.

Storage system 420 comprises a storage ephemeral key encrypter 434. The storage ephemeral key encrypter 434 may encrypt data with the storage ephemeral encryption key 504 as would be understood by one having ordinary skill in the art upon reading the present disclosure.

Architecture 500 includes client 2 side 436. Client 2 side 436, as shown, uses at-rest encryption to send unencrypted data 458 to storage system 420. The unencrypted data 458 may be encrypted and stored in the chunk storage 426. The unencrypted data 458 may be received at the client 2 side 436 unencrypted in response to a read request. In a preferred approach, the deduplication manager 424 performs deduplication in a manner substantially similar to the deduplication performed for client 1 side 402. The unencrypted data 458 may be deduplicated against data chunks encrypted with a storage system key (e.g., the storage secret encryption key 422) and/or data chunks which are not encrypted.

Client 1 side 402 may issue a request 502 to storage system 420 for an ephemeral key from the storage system 420. In one approach, the client 1 side 402 establishes a session with the storage system 420 via the request 502 to storage system 420 for an ephemeral key. The ephemeral key may be for encrypting returned data chunks. An ephemeral key 504 may be returned in response 506 to the request 502. The ephemeral key 504 may be applied to the deduplication and at least some data chunks on read. Client 1 side 402 sends a read request 508 to the storage system 420.

In a preferred approach, the deduplication manager 424 identifies data chunks associated with the read request 508 using chunk metadata 428. The identified data chunks are read 510 from the chunk storage 426. The deduplication manager 424 compares the pointers, signatures, chunk lengths, etc., from the read request 508 to any pointers, signatures, chunk lengths, etc., stored in the chunk metadata 428. In a preferred approach, the chunk metadata 428 includes an identifier for the key used to encrypt each data chunk. Data chunks encrypted with the client key may be sent 512 to the dechunker 412. An indicator that the data chunks are encrypted with the client key may also be sent 512.

Data chunks 514 that are encrypted with the storage secret encryption key 422 may be sent to the storage secret key decrypter 432. The storage secret key decrypter 432 may decrypt data encrypted with the storage secret encryption key 422. The output 516 of the storage secret key decrypter 432 may be sent to the storage ephemeral key encrypter 434. The storage ephemeral key encrypter 434 may encrypt data with the storage ephemeral encryption key 504 as would be understood by one having ordinary skill in the art upon reading the present disclosure.

In one configuration, the output 518 of the storage ephemeral key encrypter 434 may be sent to the dechunker 412. An indicator that the output 518 is encrypted with the ephemeral key 504 may sent to the dechunker 412. The dechunker 412 may dechunk data chunks received from the storage system where the data chunks are encrypted with multiple encryption keys. Data chunks encrypted with multiple encryption keys preferably refer to a set of data chunks wherein one or more data chunks are encrypted with a first key and one or more data chunks are encrypted with a second key. The dechunker 412 may identify which encryption key a data chunk is encrypted with and forward the data chunk to the corresponding decrypter (e.g., the client secret key decrypter 414, the ephemeral key decrypter 416, etc.). Specifically, the dechunker 412 sends client key encrypted data chunks 520 to the client secret key decrypter 414 and/or the dechunker 412 sends ephemeral key encrypted data chunks 522 to the ephemeral key decrypter 416. Each decrypter may decrypt data chunks encrypted with a corresponding key as would be understood by one having ordinary skill in the art upon reading the present disclosure.

In various approaches, the dechunker 412 performs any decompression operations known in the art. The dechunker 412 may merge the data chunks to produce data 524 for the client 1 side 402.

The client secret key decrypter 414 may be provided by the client 1 side 402 separate from the dechunker 412 to keep the client secret encryption key 404 secret as would be understood by one having ordinary skill in the art upon reading the present disclosure.

Data chunks encrypted with the client key and the output 518 of the storage ephemeral key encrypter 434 sent from the storage system 420 may comprise data chunk metadata including chunk signatures to verify that each chunk is correctly delivered and decrypted with the proper key. The data chunk metadata may provide an end-to-end check. In some approaches, the signature for each data chunk may be computed on the unencrypted data by the meta-generator 406 when a client secret key is used. The signature for each data chunk may be computed for any at-rest encrypted and/or unencrypted data chunks by a meta-generator (not shown) in the deduplication manager 424.

In preferred configurations of architecture 500, various compression and/or deduplication techniques may be performed without the client secret encryption key 404 ever leaving the client 1 side 402. The client secret encryption key 404 is not available to the storage system 420, client 2 side 436, any other clients, any third party service, any other storage systems, etc. A portion of the deduplication process is preferably performed on the client side (e.g., the chunking process in architecture 500) which significantly reduces or eliminates outside visibility of the client secret encryption key 404.

As described above, the ephemeral key 504 may be applied to the deduplication and at least some data chunks on read to aid in the privacy of the data. The ephemeral key 504 may be a stand transport encryption (e.g., transport layer security (TLS)). The deduplication metadata and the chunk data may be provided in the clear to the transport layer. The client key encrypted data may be re-encrypted using the ephemeral key 504 in this approach.

In preferred approaches, in contrast to conventional deduplication operations, additional chunk metadata is associated with each data chunk to indicate the key in which a chunk is encrypted. Different clients may have data chunks that are the same (e.g., duplicates with identical signatures). However, if the duplicate data chunks from different clients are encrypted with different keys, conventional deduplication of a client 1 data chunk against a client 2 data chunk requires sharing a key. In stark contrast, various configurations of the present disclosure provide a chunk identifier comprising information identifying the key used to encrypt the data chunk, an index, a tag, a signature, a key ID, etc. Information on the key ID may be provided by the client 1 side 402 to the storage system 420 prior to any input/output (I/O) operations (e.g., including the key exchange comprising the request 502 for the storage ephemeral key 440 and response 506 including the storage ephemeral key 440) if the client is using more than one key. If the client uses a single key for all data encryption, the key ID uniquely identifies the client.

In the context of data privacy, the key ID is not the key itself. For example, the key ID provided may be a cryptographic hash, such as SHA256 of a client secret encryption key 404. In another example, the key ID may be a unique index number for a client secret encryption key 404. Storage system 420 may create an internal reference key ID. For example, the storage system 420 may create an index table of keys for the ID of client secret encryption key 404.

In response to encrypted data from at least two clients having a common signature and different key IDs, the deduplication manager 424 does not dedupe the encrypted data because both the signatures and the key IDs must match to perform the deduplication. Data chunks encrypted with the storage key and/or any unencrypted data chunks may be deduped against data chunks encrypted with any client key as would be understood by one having ordinary skill in the art upon reading the present disclosure.

Chunk metadata 428 in dedupe storage (e.g., chunk storage 426) may include a reference counter in various approaches to indicate how many different pieces of data point to the data chunk. Metadata may be added to each data chunk which indicates the source key ID and a reference counter for each key ID. An attempt to read a chunk without a non-zero reference count for the request key ID may be intercepted. This interception provides access control for the deduplicated data chunks. For example, client 1 side 402 using the key ID associated with client secret encryption key 404 may have data which includes a deduped chunk A. Chunk A may be the only piece of data encrypted with client secret encryption key 404 that deduped to chunk A. Client 1 side 402 may delete the data which includes deduplicated chunk A. The reference counter for the client 1 side 402 key ID associated with secret encryption key 404 is decremented to 0. Any subsequent attempt to read chunk A with the key ID associated with client 1 side 402 secret encryption key 404 may be blocked and any requests with a non-zero associated reference count may be allowed.

If data encrypted with the client secret encryption key 404 does not dedupe initially, the data may be deduped in response to a data chunk encrypted with the storage secret encryption key 422 with a matching signature being written and/or an unencrypted data chunk being written. The process for deduping an initially non-deduplicated data chunk may be referred to as backporting in various configurations described herein. A backport may comprise a deduplication operation which stores a new data chunk (e.g., encrypted with a key that is available to the storage system 420). The backport comprises deleting any pre-existing chunks with a matching signature but a different key ID. The metadata for the stored and/or deleted data chunks may be converted to point at the new data chunk (e.g., as if the new data chunk existed first). The order in which data chunks are written in different keys does not affect the final deduplication efficiency. Any subsequent at-rest and/or unencrypted write of a copy of the data chunk decreases the stored capacity on the system using the backporting technique described herein where many private copies of a data chunk exist.

Various configurations described herein may be achieved using asymmetric encryption keys (e.g., PKI). Symmetric key encryption may be preferred over asymmetric key encryption for relatively large data sets. Asymmetric key encryption comprises a client having a public key, which is shared with the storage system, and a private key, which is not shared with the storage system. The storage system may have both a public key, which is shared with the client(s), and a private key, which is not shared with the client(s). A public key in PKI is not secret, but encrypting data in the public key requires a corresponding secret private key to decrypt the data.

Figure 6:
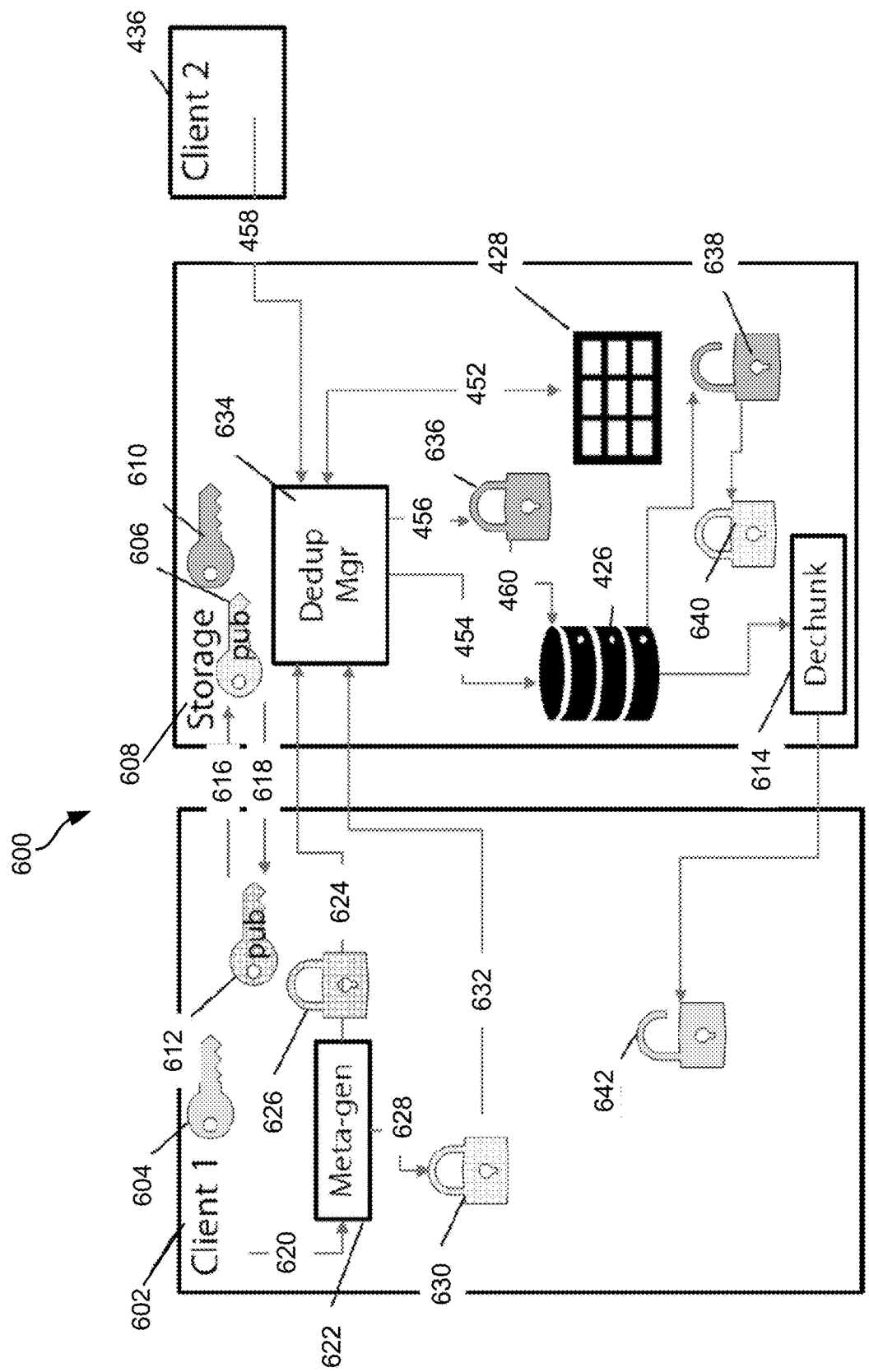
FIG. 6 is a high level architecture, in accordance with one configuration of the present invention.

FIG. 6 is a high-level architecture, in accordance with various configurations. The architecture 600 may be implemented in accordance with the present invention in any of the environments depicted in FIGS. 1-5 and 7-9, among others, in various configurations. Of course, more or less elements than those specifically described in FIG. 6 may be included in architecture 600, as would be understood by one of skill in the art upon reading the present descriptions.

Architecture 600 depicts an exemplary implementation of a write operation using asymmetric key encryption. Architecture 600 includes client 1 side 602.

Client 1 side 602 comprises a client private encryption key 604 and an associated client public key 606. Client 1 side 602 encrypts data with a client public key 606 before sending the data to the storage system 608. In contrast to the symmetric key encryption case, the storage system 608 may return all data to client 1 side 602 encrypted with the client public key 606.

Architecture 600 includes storage system 608. The storage system 608 comprises a storage private key 610 and an associated storage public key 612.

The storage system 608 may return all data to client 1 side 602 encrypted with the client public key 606. The storage system 608 comprises a dechunker 614. The dechunker 614 may operate without having knowledge of the client private encryption key 604.

In a preferred approach, prior to writing data, client 1 side 602 and storage system 608 exchange public keys. The client public key 606 may be sent 616 to the storage system 608. The storage public key 612 may be sent 618 to the client 1 side 602. The client 1 side 602 sends the write data 620 to the meta-generator 622.

In a preferred approach, the meta-generator 622 computes deduplication information (e.g., metadata) 624 associated with the write data 620. Deduplication information 624 may include operation details of a deduplication method as would be understood by one having ordinary skill in the art upon reading the present disclosure. In one configuration, for a chunking dedupe, the deduplication information 624 may include chunk start locations, chunk lengths, chunk signatures, similarity information, etc. In one approach, the chunk signature is a cryptographic hash which may be calculated in any manner known in the art. The deduplication information 624 may be encrypted with the storage public key 612 by the storage public key encrypter 626. The deduplication information 624 may be sent to storage system 608.

In one approach, the write data 620 is compressed by the meta-generator 622. Any form of compression known in the art may be used. The compressed data 628 may be sent to the client public key encrypter 630 and encrypted with the client public key 606. The client public key encrypted data 632 may be sent to the storage system 608 (e.g., the deduplication manager 634). The client public key encrypted data 632 and the deduplication information 624 may be sent to the storage system 608 (e.g., the deduplication manager 634). Data 632 is opaque to the storage system 608 (e.g., the client private encryption key 604 is not available to the storage system 608). The deduplication information 624 may be encrypted with the storage public key 612 by the storage public key encrypter 626. In another approach, the write data 620 may be encrypted with the storage public key 612 by the storage public key encrypter 626. The encrypted write data 620 and the deduplication information 624 may be sent to the storage system 608 (e.g., the deduplication manager 634). In various approaches, the deduplication information 624 and the write data 620 are tagged and/or otherwise indicated as associated.

In one configuration, the deduplication manager 634 includes a storage private key decrypter. The storage private key decrypter may decrypt data encrypted with the storage private key 610 as would be understood by one having ordinary skill in the art upon reading the present disclosure.

The deduplication manager 634 locates and/or identifies duplicate data based on the deduplication information 624. For a chunking deduplication, the deduplication information 624 is used with the chunk metadata 428 to identify data chunks that are duplicates. For example, the deduplication manager 634 compares the pointers, signatures, chunk lengths, etc., from decrypted deduplication information 624 to any pointers, signatures, chunk lengths, etc., stored in the chunk metadata 428. The deduplication manager 634 performs any associated deduplication operations as would be understood by one having ordinary skill in the art upon reading the present disclosure. Any deduplication techniques known in the art may be used.

In response to performing the associated deduplication operations, updates 452 may be performed on the chunk metadata 428. The updates 452 reflect changes due to the use of any deduplicated chunks, adding information relating to any remaining chunks, etc. Any remaining data chunks which are not deduplicated are written 454 to the chunk storage 426. The chunk metadata 428 includes information on the key ID encrypting a given data chunk.

In a preferred configuration, the deduplication manager 634 dedupes for a client against data chunks that the client (e.g., client 1 side 602) is able to decrypt. Data 41 of 67 chunks that the client 1 side 602 is able to decrypt include data chunks encrypted with a key belonging to the client 1 side 602 (e.g., the client private encryption key 604), a key belonging to the storage system 608 (e.g., storage private key 610), unencrypted data, etc.

Any remaining non-deduplicated data chunks 456 may be encrypted with the storage private key 610 at the storage private key encrypter 636.

In a preferred approach, the storage system 608 may access at-rest encrypted data, unencrypted data, shared key encrypted data, etc., because the storage system 608 may decrypt any such data as would be understood by one of ordinary skill in the art upon reading the present disclosure.

Storage system 608 comprises a storage private key decrypter 638. The storage private key decrypter 638 may decrypt data encrypted with the storage private encryption key 610 as would be understood by one having ordinary skill in the art upon reading the present disclosure.

Storage system 608 comprises a client public key encrypter 640. The client public key encrypter 640 may encrypt data with the client public key 606 as would be understood by one having ordinary skill in the art upon reading the present disclosure.

In one approach, the storage system 608 may return data chunks via the dechunker 614 to be decrypted by a client private key decrypter 642 in any manner known in the art.

Client 2 side 436, as shown, uses at-rest encryption to send unencrypted data 458 to storage system 608. The unencrypted data 458 may be encrypted and stored in the chunk storage 426. The unencrypted data 458 may be received at the client 2 side 436 unencrypted in response to a read request. In a preferred approach, the deduplication manager 634 performs deduplication in a manner substantially similar to the deduplication performed for client 1 side 602. The unencrypted data 458 may be deduplicated against data chunks encrypted with a storage system key (e.g., the storage private key 610) and/or data chunks which are not encrypted. Any remaining non-deduplicated data chunks 456 may be encrypted with the storage private key 610 at the storage private key encrypter 636. The encrypted, non-deduplicated data chunks 460 may be written to the chunk storage 426. Storage system 608 may decrypt any data delivered according to the preceding operations. All of the data chunks 460 may be used to deduplicate against any chunks encrypted herein.

Figure 7:
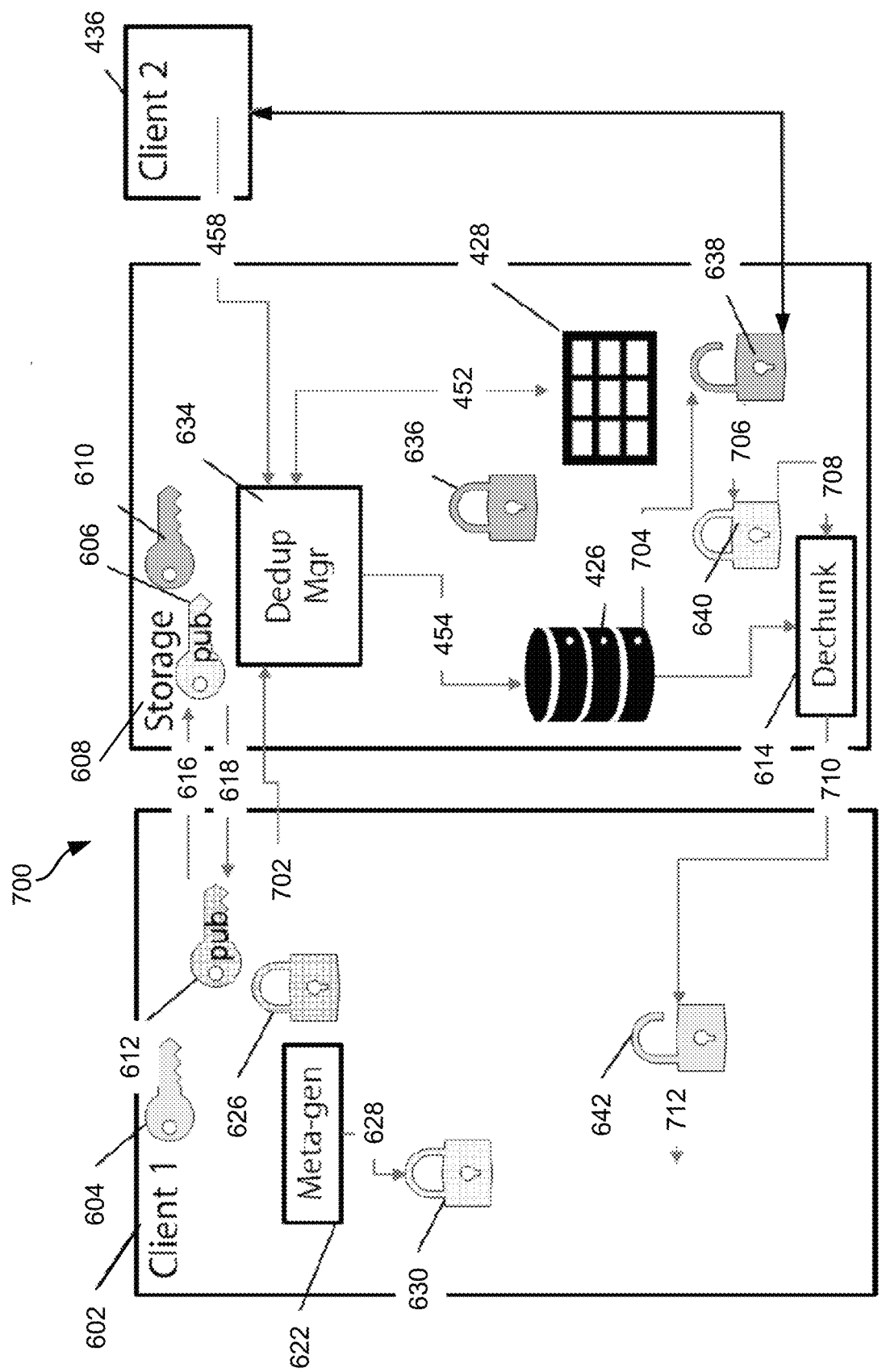
FIG. 7 is a high level architecture, in accordance with one configuration of the present invention.

FIG. 7 is a high-level architecture, in accordance with various configurations. The architecture 700 may be implemented in accordance with the present invention in any of the environments depicted in FIGS. 1-6 and 8-9, among others, in various configurations. Of course, more or less elements than those specifically described in FIG. 7 may be included in architecture 700, as would be understood by one of skill in the art upon reading the present descriptions.

Architecture 700 depicts an exemplary implementation of a read operation using asymmetric key encryption. Architecture 600 includes client 1 side 602. Client 1 side 602 comprises a client private encryption key 604 and an associated client public key 606. Architecture 700 includes storage system 608. The storage system 608 comprises a storage private key 610 and an associated storage public key 612.

In preferred approach, prior to writing data, client 1 side 602 and storage system 608 exchange public keys. The client public key 606 may be sent 616 to the storage system 608. The storage public key 612 may be sent 618 to the client 1 side 602. The client 1 side 602 sends the write data 620 to the meta-generator 622.

Client 1 side 602 sends a read request 702 to the storage system 608 (e.g., the deduplication manager 634). The deduplication manager 634 locates and/or identifies data chunks associated with the read request 702 using the chunk metadata 428. Any identified data chunks may be read from the chunk storage 426. The chunk metadata 428 includes an identifier for the key used to encrypt the data chunk(s). Data chunks which are encrypted with the client private encryption key 604 may be sent to the dechunker 614. The indicator that the data chunks are encrypted with the client private encryption key 604 may be sent to the dechunker 614.

Data chunks which are identified as encrypted with the storage private key 610 may be sent 704 to the storage private key decrypter 638. The storage private key decrypter 638 may decrypt data encrypted with the storage private encryption key 610 as would be understood by one having ordinary skill in the art upon reading the present disclosure. The output 706 of the storage private key decrypter 638 may be sent to the client public key encrypter 640. The client public key encrypter 640 may encrypt data with the client public key 606 as would be understood by one having ordinary skill in the art upon reading the present disclosure. The output 708 of the client public key encrypter 640 may be sent to the dechunker 614. In contrast to the symmetric key implementation, all the data chunks sent to the dechunker 614 are encrypted with the client public key 606. The dechunker 614 may perform any decompression on the data chunks. In a preferred approach, the dechunker 614 merges all the data chunks into a merged data set 710 and sends the merged data set 710 to the client private key decrypter 642. The client private key decrypter 642 may decrypt the merged data set 710 as would be understood by one having ordinary skill in the art upon reading the present disclosure. The output 712 of the client private key decrypter 642 comprises any data chunks associated with the initial read request 702.

Figure 8:
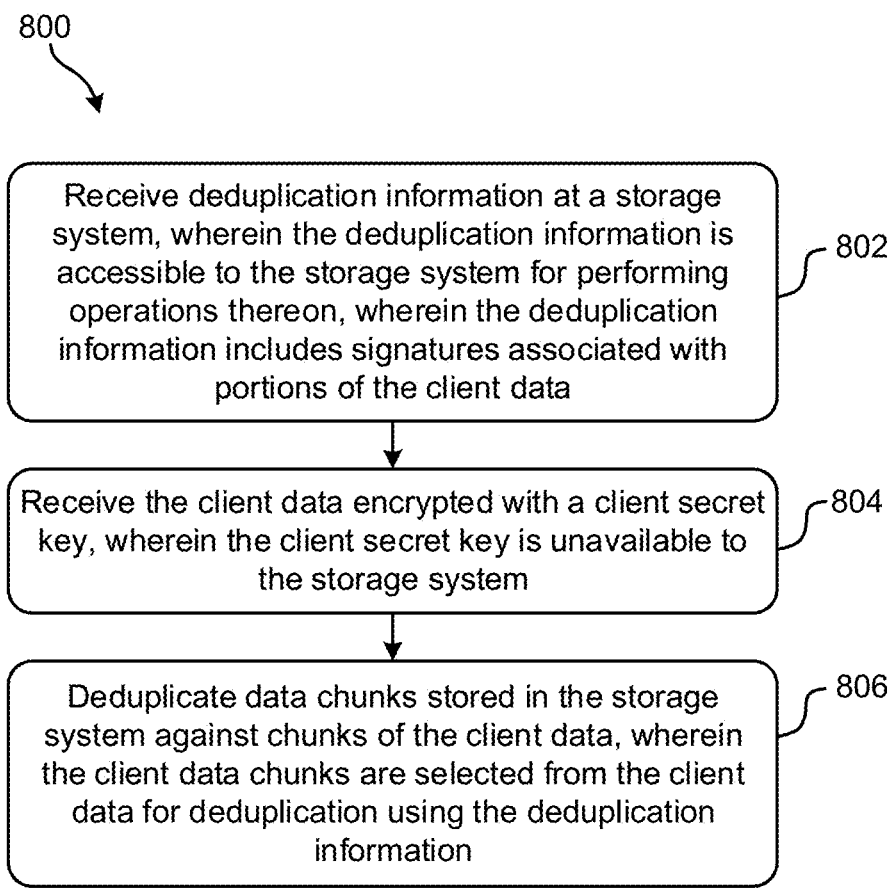
FIG. 8 is a flowchart of a method, in accordance with one configuration of the present invention.

Now referring to FIG. 8, a flowchart of a method 800 is shown according to one configuration. The method 800 may be performed in accordance with the present invention in any of the environments depicted in FIGS. 1-7 and 9, among others, in various configurations. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various configurations, the method 800 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 includes operation 802 comprising receiving deduplication information at a storage system, wherein the deduplication information includes signatures associated with portions of the client data. In a preferred approach, the deduplication information is encrypted with a shared ephemeral key. In one approach, the storage system receives deduplication information encrypted with a shared ephemeral key at a deduplication manager. In one configuration, the deduplication manager includes an ephemeral key decrypter. The ephemeral key decrypter may decrypt data encrypted with the storage ephemeral encryption key as would be understood by one having ordinary skill in the art upon reading the present disclosure. In a preferred configuration, the deduplication information is accessible to the storage system (e.g., received by the storage system in the clear, received in a manner that the storage system may operate on the information, etc.).

Deduplication information may include operation details of a deduplication method as would be understood by one having ordinary skill in the art upon reading the present disclosure. In one configuration, for a chunking dedupe, the deduplication information may include chunk start locations, chunk lengths, chunk signatures, similarity information, etc. In one approach, the chunk signature is a cryptographic hash which may be calculated in any manner known in the art. The deduplication information is preferably encrypted with the storage ephemeral key (e.g., a shared ephemeral key).

Operation 804 includes receiving client data encrypted with a client secret key, wherein the client secret key is unavailable to the storage system. The client data is opaque to the storage system (e.g., the client secret key is not available to the storage system). A key which is unavailable to the storage system is a key which encrypts data that the storage system cannot decrypt.

Operation 806 includes deduplicating data chunks stored in the storage system against chunks of the client data, wherein the client data chunks are selected from the client data for deduplication using the deduplication information. In one approach, the deduplication manager locates and/or identifies duplicate data based on the deduplication information. For a chunking deduplication, the deduplication information is used with chunk metadata to identify data chunks that are duplicates. For example, the deduplication manager compares the pointers, signatures, chunk lengths, etc., from the decrypted deduplication information to any pointers, signatures, chunk lengths, etc., stored in a chunk metadata repository on the storage system. The deduplication manager performs any associated deduplication operations as would be understood by one having ordinary skill in the art upon reading the present disclosure. In preferred approaches, the storage system stores metadata for the data chunks wherein the metadata includes a key identifier which uniquely identifies the key used to encrypt the data chunks.

In response to performing the associated deduplication operations, updates may be performed on the chunk metadata repository. The updates reflect changes due to the use of any deduplicated chunks, adding information relating to any remaining chunks, etc. The chunk metadata repository includes information on the key ID encrypting a given data chunk. Any remaining data chunks associated with a new signatures (e.g., non-pre-existing in the chunk metadata repository) which are not deduplicated are written to the storage system. Any new, non-deduplicated data chunks are written to the storage system.

In a preferred configuration, the deduplication manager dedupes for a client against data chunks that the client is able to decrypt. Data chunks that the client side is able to decrypt include data chunks in a key belonging to the client (e.g., encrypted with the client secret key), a key belonging to the storage system (e.g., a storage secret encryption key), unencrypted data, etc. The client may be unable to decrypt data encrypted with a unique client secret encryption key that the client does not have access to.

Any remaining non-deduplicated data chunks associated with a metadata update may be encrypted with the storage secret encryption key at a storage secret key encrypter. Non-deduplicated data chunks associated with a metadata update may refer to data chunks which preexist within the chunk metadata repository and a metadata update includes an additional pointer to a corresponding storage location. In various approaches, any client data chunk which is not deduplicated is stored in the storage system encrypted with the client secret key.

In a preferred approach, the storage system may access data at-rest encrypted data, unencrypted data, shared key encrypted data, etc., because the storage system may decrypt any such data as would be understood by one of ordinary skill in the art upon reading the present disclosure.

In one approach, the storage system comprises data chunks encrypted with the shared ephemeral key. The shared ephemeral key is available to the storage system. The storage system may perform deduplication operations on data chunks encrypted with the shared ephemeral key against data chunks which are encrypted with a client secret key and against data chunks which are encrypted with a shared ephemeral key.

In one approach, a storage system may receive data encrypted with a second client secret key. The storage system may deduplicate data chunks encrypted with a second client secret key against data chunks which are encrypted with multiple keys according to the backporting operations described above.

Figure 9:
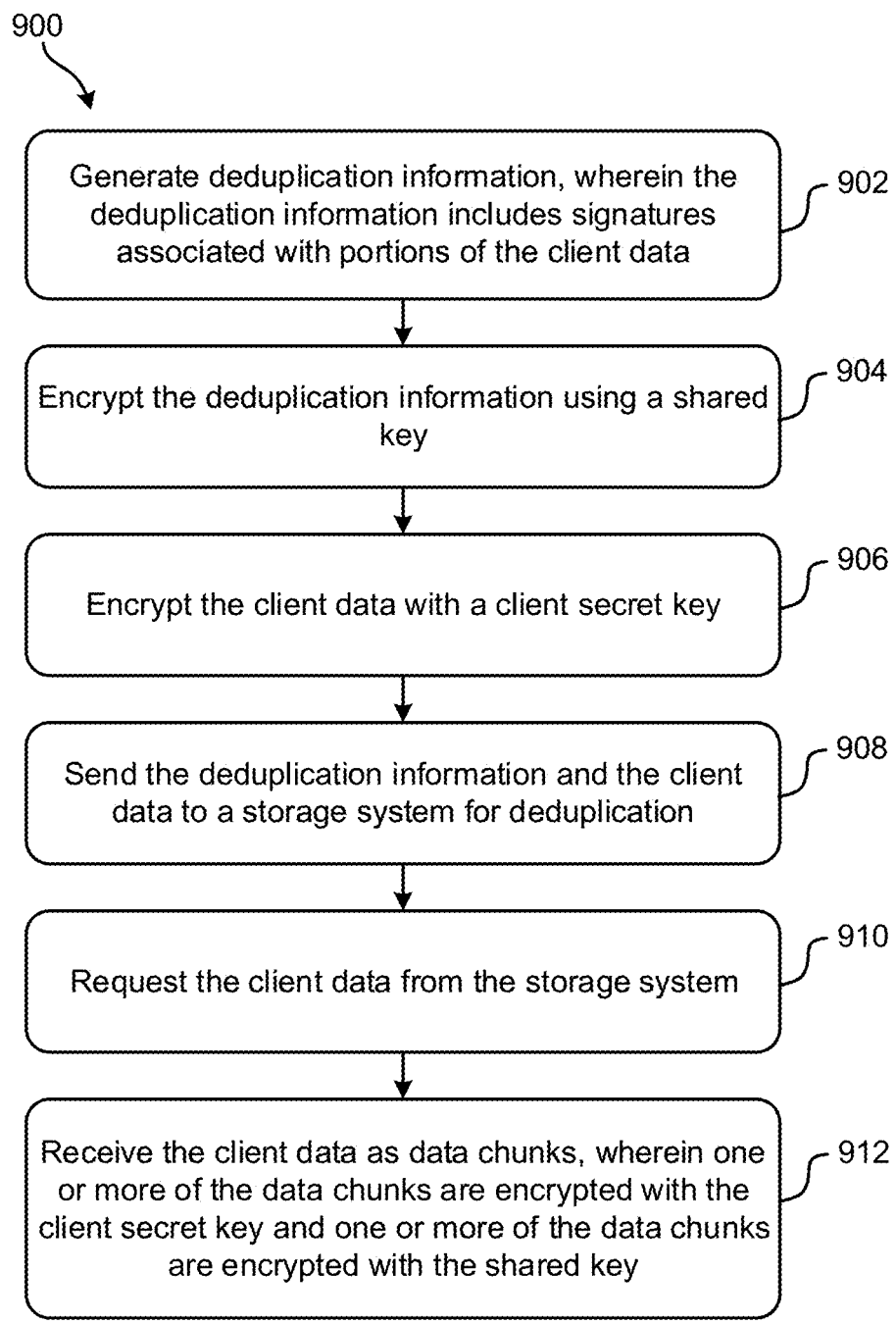
FIG. 9 is a flowchart of a method, in accordance with one configuration of the present invention.

Now referring to FIG. 9, a flowchart of a method 900 is shown according to one configuration. The method 900 may be performed in accordance with the present invention in any of the environments depicted in FIGS. 1-8, among others, in various configurations. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various configurations, the method 900 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 includes operation 902 comprising generating deduplication information, wherein the deduplication information includes signatures associated with portions of the client data. In a preferred approach, a meta-generator computes deduplication metadata associated with the data. In various configurations, the meta-generator may be located on a client side and/or on a storage system.

In a preferred approach, the meta-generator performs metadata operations on data on the client side and identifies data deduplication opportunities in the data. The meta-generator identifies data deduplication opportunities using any data deduplication techniques known in the art. In one aspect, the meta-generator uses a sliding window variable chunk deduplication technique to identify data deduplication opportunities. The meta-generator identifies and/or calculates deduplication signatures (e.g., rolling min hashes, cryptographic hashes, etc.). The meta-generator generates metadata associated with the data deduplication opportunities (e.g., deduplication information) including pointers, chunk lengths, chunk signatures, etc. The deduplication information may be encrypted with a shared ephemeral key provided by the storage system in response to a request from the client side for the shared ephemeral key.

Deduplication information may include operation details of a deduplication method as would be understood by one having ordinary skill in the art upon reading the present disclosure. In one configuration, for a chunking dedupe, the deduplication information may include chunk start locations, chunk lengths, chunk signatures, similarity information, etc. In one approach, the chunk signature is a cryptographic hash which may be calculated in any manner known in the art.

Operation 904 comprises encrypting the deduplication information using a shared ephemeral key. The client side may comprise an ephemeral key encrypter. The ephemeral key encrypter may encrypt data with the storage ephemeral key as would be understood by one having ordinary skill in the art upon reading the present disclosure.

Operation 906 comprises encrypting the client data with a client secret key. The client side may comprise a client secret key encrypter. The client secret key encrypter may encrypt data with the client secret key as would be understood by one having ordinary skill in the art upon reading the present disclosure. In preferred approaches, the client secret key never leaves the client side. In this preferred approach, a storage system does not see the encrypted data in the clear at any point in a data transfer. In this preferred approach, the client secret key is not shared with the storage system, any other clients, any other storage system, etc. The client secret key may be a symmetric key, an asymmetric key, etc. In one aspect, the client secret key is a symmetric key.

In some approaches, various compression techniques may be applied to the client data before and/or after chunking. In one configuration, pre-chunking compression may be a type of compression which improves the performance of the chunking. In another configuration, post-chunking compression may be tuned towards minimizing the resulting chunk size.

Signature computation may be performed on the data chunk before and/or after compression. Pre-compression signature computations allow the signatures to be verified after decompression on read. Post-compression signature computations allow the signatures to be checked while the chunk is in a compressed state.

In various approaches, the deduplication information and the client data are tagged and/or otherwise indicated as associated. In a preferred approach, the deduplication information is computed on the unencrypted data. The unencrypted data may include the chunk signature. Deduplication information may be computed over the encrypted data.

Deduplication information which is computed over the encrypted data may include the signature of the encrypted chunk.

Operation 908 comprises sending the deduplication information and the client data to a storage system for deduplication. The deduplication information and the client data may be sent to the storage system for deduplication in any manner known in the art.

Operation 910 comprises requesting the client data from the storage system. The client data may be requested in any manner known in the art.

In one approach, the request for the client data from the storage system includes verifying the request with a signed access control. In some approaches, asymmetric key encryption signing may be used as a secure access control for symmetric key encryption data transport. The client may sign all I/O requests with the client private encryption key (e.g., the client private PKI key). For example, for symmetric key encryption of client data, a client private PKI key may be used for identity verification. The storage system may verify the signature using the public key. Similarly, the storage system may sign I/O returns with a storage private encryption key which may be verified by the client using the public key.

Operation 912 comprises receiving the client data as data chunks, wherein at least some of the data chunks are encrypted with the client secret key and at least some of the data chunks are encrypted with the shared ephemeral key. The client data as data chunks may be received in any manner known in the art.

In one approach, the client side comprises a dechunker. The dechunker may dechunk data chunks received from the storage system where the data chunks are encrypted with multiple encryption keys. Data chunks encrypted with multiple encryption keys preferably refer to a set of data chunks wherein one or more data chunks are encrypted with a first key and one or more data chunks are encrypted with a second key. The dechunker may identify which encryption key a data chunk is encrypted with and forward the data chunk to the corresponding decrypter (e.g., a client private key decrypter, a shared ephemeral key decrypter, etc.). Each decrypter may decrypt data chunks encrypted with a corresponding key as would be understood by one having ordinary skill in the art upon reading the present disclosure.

In various configurations disclosed herein, compression and/or deduplication are performed without the client secret encryption key ever leaving the client side. The storage system never has access to the client secret encryption key and no third party has visibility to the client secret encryption key in preferred configurations.

In other approaches, a hybrid of symmetric and asymmetric encryption may be used. For example, the storage system may use symmetric key encryption for storing chunks in the storage key and asymmetric keys may be used for the client data.

In one approach, a client and/or a storage system may have more than one key. Various configurations disclosed herein may be applied to block, object, file storage systems, etc. It should be understood by one having ordinary skill in the art upon reading the present disclosure that unencrypted data may refer to data encrypted with a key which is available to the storage system (e.g., the storage system may view the data in the clear).

In some approaches, the metadata created by the metagenerator (e.g., the deduplication information) may be relatively more general than for deduplication. For example, the deduplication information may be used to create a keyword index for text data. A keyword index may be used by the storage system to perform search operations on encrypted data including returning any found information to the client to be decrypted.

In another example, the deduplication information may be used to create an event detector for video information. The event detector may create pointers and/or information related to detected events. The event detector may provide additional classifications for detected events. The storage system may perform search operation against this metadata and identify portions of data that meet certain criteria to reduce the I/O workload. Various other classification, tagging locating, etc., techniques may benefit from these operations with or without the deduplication function.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving deduplication information at a storage system, wherein the deduplication information is accessible to the storage system for performing operations thereon, wherein the deduplication information includes signatures associated with portions of client data;
   receiving the client data encrypted with a client secret key, wherein the client secret key is unavailable to the storage system; and
   deduplicating data chunks stored in the storage system against chunks of the client data, wherein the client data chunks are selected from the client data for deduplication using the deduplication information.

2. The computer-implemented method of claim 1, wherein the deduplication information is encrypted with a shared key, wherein the storage system comprises data chunks encrypted with the shared key, wherein the shared key is available to the storage system, wherein the deduplication is performed on data chunks encrypted with a key selected from the group consisting of: a client secret key and a shared key.

3. The computer-implemented method of claim 2, wherein a client data chunk which is not deduplicated is stored in the storage system encrypted with the client secret key.

4. The computer-implemented method of claim 1, wherein the storage system stores metadata for the data chunks, wherein the metadata includes a key identifier which uniquely identifies the key used to encrypt the data chunks.

5. The computer-implemented method of claim 1, comprising receiving data encrypted with a second client secret key; and deduplicating data chunks, wherein one or more data chunks are encrypted with the first client secret key and one or more data chunks are encrypted with the second client secret key.

6. The computer-implemented method of claim 1, wherein the client secret key is not shared with the storage system.

7. The computer-implemented method of claim 1, wherein the client secret key is not shared with any other clients.

8. A computer program product for opaque encryption, the computer program product comprising a computer readable storage medium having program instructions embodied therewith, the program instructions executable by a computer to cause the computer to:
   receive, by the computer, deduplication information at a storage system, wherein the deduplication information is accessible to the storage system for performing operations thereon, wherein the deduplication information includes signatures associated with portions of client data;
   receive, by the computer, the client data encrypted with a client secret key, wherein the client secret key is unavailable to the storage system; and
   deduplicate, by the computer, data chunks stored in the storage system against chunks of the client data, wherein the client data chunks are selected from the client data for deduplication using the deduplication information.

9. The computer program product of claim 8, wherein the deduplication information is encrypted with a shared key, wherein the storage system comprises data chunks encrypted with the shared key, wherein the shared key is available to the storage system, wherein the deduplication is performed on data chunks encrypted with a key selected from the group consisting of: a client secret key and a shared key.

10. The computer program product of claim 9, wherein a client data chunk which is not deduplicated is stored in the storage system encrypted with the client secret key.

11. The computer program product of claim 8, wherein the storage system stores metadata for the data chunks, wherein the metadata includes a key identifier which uniquely identifies the key used to encrypt the data chunks.

12. The computer program product of claim 8, comprising program instructions to cause the computer to: receive, by the computer, data encrypted with a second client secret key; and deduplicate, by the computer, data chunks, wherein one or more data chunks are encrypted with the first client secret key and one or more data chunks are encrypted with the second client secret key.

13. The computer program product of claim 8, wherein the client secret key is not shared with the storage system.

14. The computer program product of claim 8, wherein the client secret key is not shared with any other clients.

15. A system, comprising:
   a processor; and
   logic integrated with the processor, executable by the processor, or integrated with and executable by the processor, the logic being configured to:
   receive deduplication information at a storage system, wherein the deduplication information is accessible to the storage system for performing operations thereon, wherein the deduplication information includes signatures associated with portions of client data;
   receive the client data encrypted with a client secret key, wherein the client secret key is unavailable to the storage system; and
   deduplicate data chunks stored in the storage system against chunks of the client data, wherein the client data chunks are selected from the client data for deduplication using the deduplication information.

16. The system of claim 15, wherein the deduplication information is encrypted with a shared key, wherein the storage system comprises data chunks encrypted with the shared key, wherein the shared key is available to the storage system, wherein the deduplication is performed on data chunks encrypted with a key selected from the group consisting of: a client secret key and a shared key.

17. The system of claim 16, wherein a client data chunk which is not deduplicated is stored in the storage system encrypted with the client secret key.

18. The system of claim 15, wherein the storage system stores metadata for the data chunks, wherein the metadata includes a key identifier which uniquely identifies the key used to encrypt the data chunks.

19. The system of claim 15, comprising logic configured to: receive data encrypted with a second client secret key; and deduplicate data chunks, wherein one or more data chunks are encrypted with the first client secret key and one or more data chunks are encrypted with the second client secret key.

20. The system of claim 15, wherein the client secret key is not shared with the storage system.

21. The system of claim 15, wherein the client secret key is not shared with any other clients.

* * * * *